UNITED STATES PATENT OFFICE.

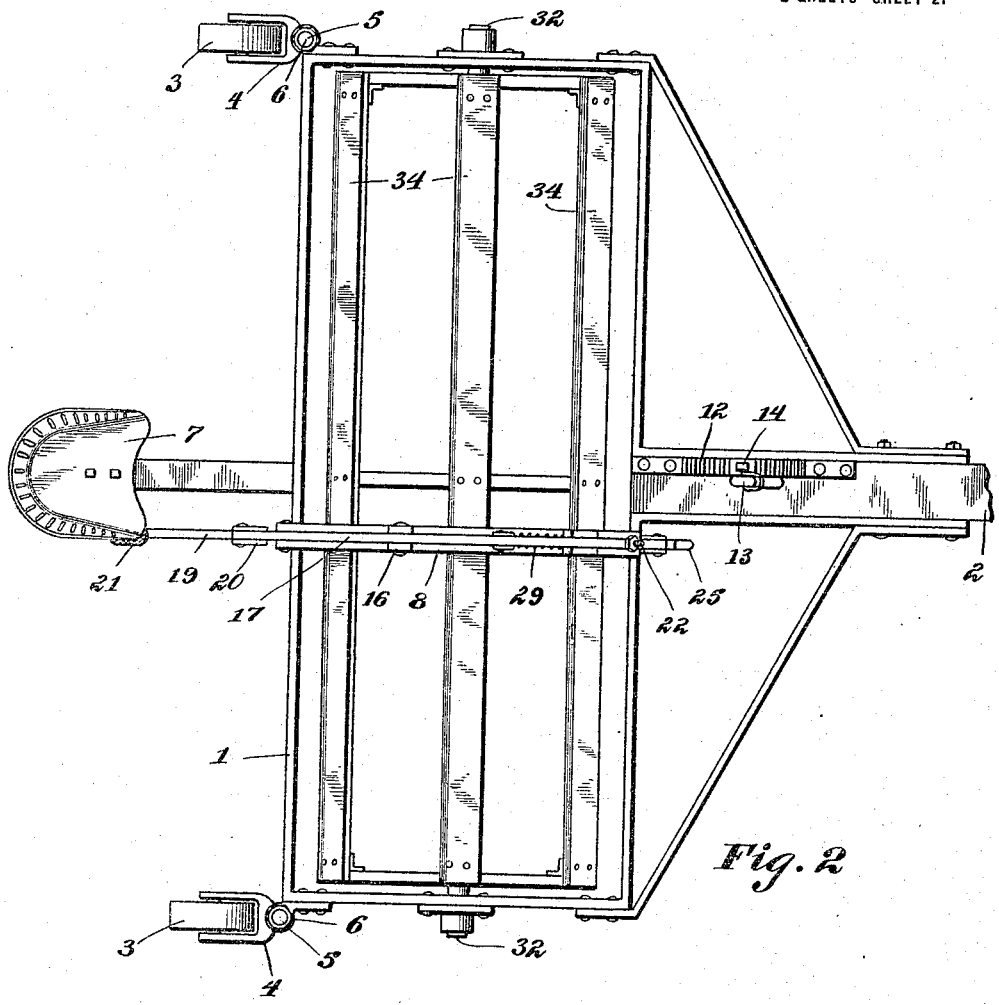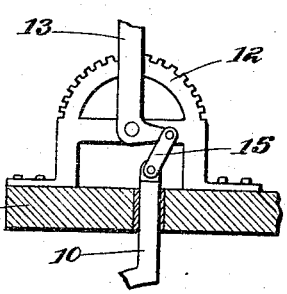

JAMES MATNEY, OF LIVINGSTON, MONTANA, ASSIGNOR OF ONE-HALF TO E. ROBERTS, OF LIVINGSTON, MONTANA.

ROTARY WEEDER AND CULTIVATOR.

1,227,166.     Specification of Letters Patent.     Patented May 22, 1917.

Application filed August 2, 1916. Serial No. 112,867.

*To all whom it may concern:*

Be it known that I, JAMES MATNEY, a citizen of the United States, residing at Livingston, in the county of Park and State of Montana, have invented new and useful Improvements in Rotary Weeders and Cultivators, of which the following is a specification.

This invention relates to rotary weeders and cultivators and it consists in the novel features hereinafter described and claimed.

An object of the invention is to provide a combined implement or machine of the character indicated which may be used for all kinds of summer fallowing for the destruction of weeds and for the cultivation of the soil. The implement may also be used to advantage for preparing the soil for seeding.

With these objects in view the implement includes a frame having a draft tongue attached to the forward portion thereof. Caster wheels support the rear portion of the frame and a vertically adjustable wheel supports the forward portion thereof. A lever mechanism is provided for adjusting the last mentioned wheel. A shaft is journaled in the frame and wheels are mounted upon the said shaft. Blades are attached to the peripheries of the last mentioned wheels and are disposed transversely thereof. The said blades are spaced from each other. An arch structure is mounted upon the frame and a standard is mounted upon the said structure. An arm is pivotally mounted upon the said standard and is provided at its lower edge with a shoulder. A foot lever is pivoted at the rear portion of the arch structure and operatively connected with the said arm. An operator's seat may be attached to the frame and the said foot lever may be manipulated by the occupant of the said seat. A lever is fulcrumed at the forward portion of the arch structure and operatively connected with the said arm and may be manipulated by the operator of a tractor when the implement is drawn by such motive power. A spring connects the said arm with the arch structure and holds the arm at a normal position. A latch is pivoted upon the arch structure and is adapted to engage the shoulder of the lever and is adapted to be encountered by one of the blades upon the wheel mounted upon the shaft whereby the said blades and the said wheels are temporarily held against turning movement. A spring connects the said bar with the arch structure and serves to return the bar to a normal position after it has been moved to an abnormal position in consequence of excessive stress applied to one of the blades.

In the accompanying drawings:—

Fig. 2 is a top plan view of the same.

Fig. 3 is a detail view of parts of the same.

Figure 1:
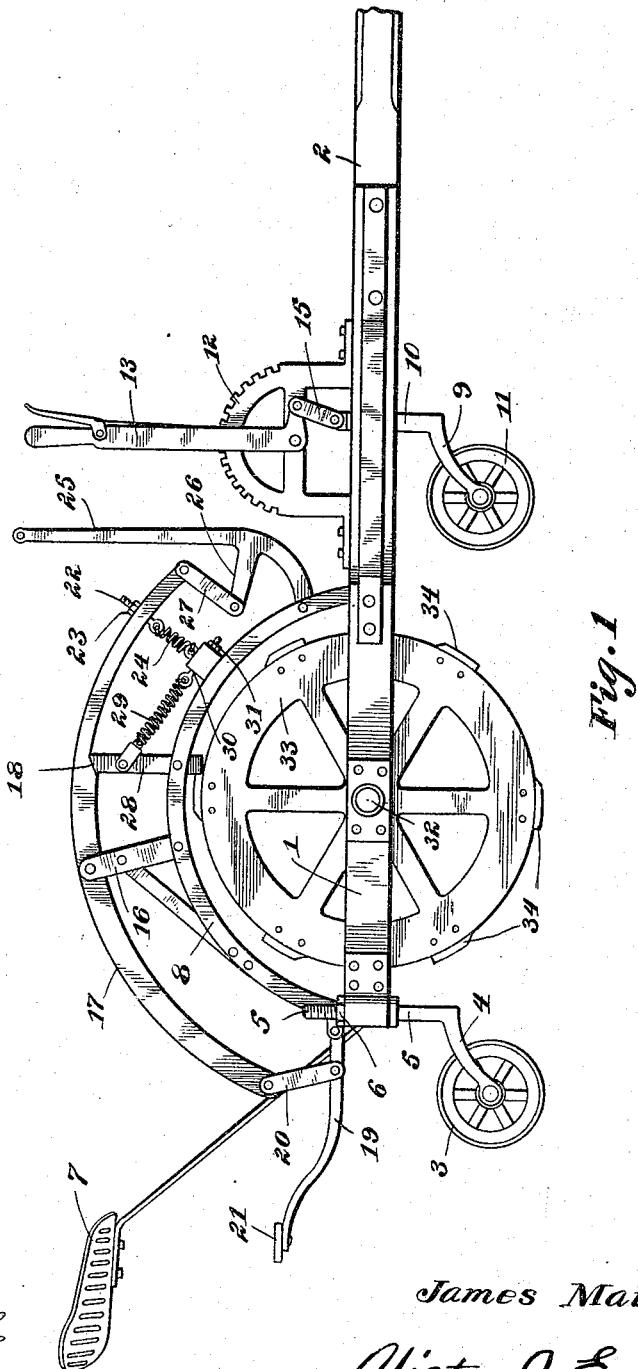
Figure 1 is a side elevation of the weeder and cultivator.

The weeder includes a frame 1 which is preferably rectangular in plan and to the forward portion of which is attached a draft tongue 2 of usual pattern. Caster wheels 3 are journaled in brackets 4 the shanks 5 of which pass vertically through the rear portion of the frame 1 and are secured at adjusted positions by means of nuts 6 screwthreaded thereon. An operator's seat 7 is mounted at the intermediate portion of the rear part of the frame 1 and an arch structure 8 is also mounted at the intermediate portion of the said frame. A bracket 9 is provided with a shank 10 which is slidably received in the tongue 2 in advance of the frame 1. A wheel 11 is journaled in the said bracket. A dentate segment 12 is mounted upon the tongue 2 and a lever 13 is fulcrumed at the side of the said segment. The said lever carries a spring pressed pawl 14 adapted to engage the teeth of the segment 12 whereby the said lever is held at an adjusted position. A link 15 is pivotally connected at one end with the lower end of the lever 13 and pivotally connected at its other end with the shank 10. Therefore it will be seen that when the lever 13 is swung the link 15 is moved longitudinally whereby the shank 10 is moved vertically and the wheel 11 raised or lowered. A standard 16 is mounted upon the arch structure 8 and an arm 17 is pivoted upon the said standard. The arm 17 is provided at its under edge and at a point in advance of the standard 16 with an inclined shoulder 18. A lever 19 is fulcrumed to the rear portion of the arch structure 8 and is operatively connected with the rear portion of the arm 17 by means of a link 20. The said lever 19 is provided at its rear end with a foot tread 21 which is within reach of one occupying the seat 7. A bolt 22 passes through the forward portion of the arm 17 and may be adjusted therein by means of a nut 23 which is screwthreaded thereon and which bears at its lower face against the upper edge of the arm 17. A spring 24 is connected at one end with the bolt 22 and at its other end with the arch structure 8, as best shown in Fig. 1 of the drawing.

A lever 25 is pivoted at the forward portion of the arch structure 8 and is provided with an angularly and rearwardly disposed arm 26 which is operatively connected with the forward end of the arm 7 by means of a link 27. A latch bar 28 is pivoted to the upper intermediate portion of the arch structure 8 and the lower end of the said bar is normally held below the lower edge of the intermediate portion of the said structure 8. A spring 29 is connected at one end with the latch bar 28 and at its other end with a bolt 30 which is adjustably connected with the arch structure 8 by means of a nut 31 screwthreaded thereon. The tension of the spring 29 is such as to normally hold the latch bar 28 in an upright position with its upper end in contact with the shoulder 18 of the arm 17. The tension of the spring 24 is such as to hold the shoulder 18 of the said arm down against the upper end of the latch bar 28.

A shaft 32 is journaled in the frame 1 and is provided with a plurality of wheels 33. Spaced blades 34 are mounted upon the peripheries of the wheels 33 and disposed transversely with relation to the said wheels. When the latch bar 28 is in an upright position its lower end is in the path of movement of the uppermost blade 34 and when this is the case there is a blade 34 located at the lowermost portions of the peripheries of the wheels 33 as best indicated in Fig. 1 of the drawing.

In operation the lever 13 is swung so that the wheel 11 is positioned at a desired distance below the frame 1 and the tongue 2 and as the implement is drawn along the soil the lowermost blade 34 enters the same and cuts out the weeds or superfluous growth of plants and at the same time pulverizes or cultivates the soil. In the event that the lowermost blade 24 should strike hard ground, a stone or other obstruction the resistance thereby caused will swing the latch bar 28 against the tension of the spring 29 and inasmuch as the upper end of the latch bar 28 is in engagement with the inclined shoulder 18 of the arm 17 the forward portion of the arm 17 is swung in an upward direction against the tension of the spring 24 and the wheels 33 will rotate until the said obstruction is passed. At such time as when the resistance against the lowermost blade 34 becomes normal the spring 29 will draw the latch bar 28 back to its normal upright position and the spring 24 will draw the forward portion of the arm 17 in a downward direction whereby the shoulder 18 will be brought into engagement with the upper end of the said latch bar 28. Thus the parts automatically assume their normal position and the weeding and cultivating process continues. In the event that the lowermost blade 34 should accumulate trash or other matter an operator who occupies the seat 7 may depress the rear end of the lever 19 by placing his foot upon the tread 21 whereby the arm 17 is swung to lift the shoulder 18 above the upper end of the latch bar 28. Thus the upper end of the said latch bar being relieved of any support or abutment the wheel 33 may rotate and the material which has been collected by the blades will fall therefrom. In the event that the machine or implement is attached to a tractor or other mechanical draft means the operator who is upon the said draft means may swing the lever 25 by attaching a cord to the upper end thereof and swing the arm 17 to release the upper end of the latch bar 28 as hereinbefore described. When the implement or machine is to be drawn along a rod the lever 13 is swung to lower the wheel 11 and thus the lowermost blade 34 will be raised above the surface of the ground and the machine may be readily transported from point to point.

From the foregoing description taken in conjunction with the accompanying drawing it will be seen that a weeder and cultivator of simple and durable structure is provided and that the same is provided with means for automatically causing the cultivating or weeding blade to turn about an axis when the same encounters an obstruction and furthermore there are manually operable means for releasing the cutting blades to permit them to turn in the event that they should accumulate material.

Having described the invention what is claimed is:—

1. A weeder comprising a wheel mounted frame, spaced blades carried by the same and arranged to rotate about an axis, an arch structure mounted upon the frame, a latch bar pivoted upon the arch structure, spring means for holding a portion of the latch bar in the path of movement of the blades and an arm pivoted upon the arch structure and having a shoulder engageable with the said latch bar.

2. A weeder comprising a wheel mounted frame, spaced blades carried by the frame and arranged to rotate about an axis, an arch structure mounted upon the frame, a latch bar pivoted upon the arch structure, spring means for normally holding a portion of the latch bar in the path of movement of the blades, an arm pivoted upon the arch structure and having a shoulder which normally engages the end of the latch bar and spring means for holding the arm at a normal position.

3. A weeder comprising a wheel mounted frame, a series of spaced blades carried by the frame and arranged to rotate about an axis, an arch structure mounted upon the frame, a spring actuated latch bar pivoted upon the arch structure and having a portion normally held in the path of movement of the blade, an arm pivoted upon the arch structure and having a shoulder which normally engages the end of the latch bar, spring means for holding the arm at a normal position and a lever fulcrumed upon the arch structure and operatively connected with the said arm.

4. A weeder comprising a wheel mounted frame, a series of spaced blades carried by the frame and arranged to rotate about an axis, an arch structure mounted upon the frame, a latch bar pivoted upon the arch structure, spring means for holding a portion of the latch bar in the path of movement of the blades, an arm pivoted upon the arch structure and having a shoulder adapted to engage the end of the said latch bar, spring means for holding the arm at a normal position, and levers pivoted one at the forward portion of the arch structure and one at the rear portion of the said structure, the said levers being operatively connected with the adjacent ends of the said arm.

In testimony whereof I affix my signature in presence of two witnesses.

JAMES MATNEY.

Witnesses:
CHARLES MILICE,
J. L. BRADY.

Copies of this patent may be obtained for five cents each, by addressing the "Commissioner of Patents, Washington, D. C."